(12) United States Patent
Alspaugh

(10) Patent No.: US 7,756,760 B2
(45) Date of Patent: Jul. 13, 2010

(54) SYSTEM FOR DETERMINING SHORTAGE COSTS

(75) Inventor: Julie Anne Alspaugh, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 12/112,045

(22) Filed: Apr. 30, 2008

(65) Prior Publication Data

US 2009/0276253 A1 Nov. 5, 2009

(51) Int. Cl.
*G06Q 10/00* (2006.01)
(52) U.S. Cl. .................. 705/28; 705/1; 705/7; 705/22; 705/36; 705/400
(58) Field of Classification Search .................. None
See application file for complete search history.

(56) References Cited

U.S. PATENT DOCUMENTS

| 6,341,269 | B1 * | 1/2002 | Dulaney et al. | 705/22 |
| 2004/0068454 | A1 * | 4/2004 | Jacobus et al. | 705/36 |
| 2004/0236591 | A1 * | 11/2004 | Johnson et al. | 705/1 |
| 2007/0150379 | A1 * | 6/2007 | Vernaci et al. | 705/28 |
| 2007/0282762 | A1 * | 12/2007 | Chacon et al. | 705/400 |
| 2009/0089113 | A1 * | 4/2009 | Rousso et al. | 705/7 |

OTHER PUBLICATIONS

Are Global Supply Chains Too Risky? A Practitioner's Perspective, Crone, Mark, Supply Chain Management Review v10n4 pp. 28-30, 32-35 May/Jun. 2006.*
Foreman, John et al. "Implementing Supply Routing Optimization in a Make-To-Order Manufacturing Network." Jul. 25, 2008. 36 pages.
Caro, Felipe, and Gallien, Jeremie. "Dynamic Assortment with Demand Learning for Seasonal Consumer Goods." Management Science vol. 53, No. 2. Feb. 2007. pp. 276-292.

* cited by examiner

*Primary Examiner*—Matthew S Gart
*Assistant Examiner*—R. Shay Glass
(74) *Attorney, Agent, or Firm*—Hamilton & Terrile, LLP; Stephen A. Terrile

(57) ABSTRACT

A system that can determine shortage costs in a repeatable and sustainable manner. In certain embodiments, the system takes into account different shortage costs that impact different organizations and weight those shortage costs against the costs to expedite material in to cover those shortages. Additionally, in certain embodiments, the system can continue to be updated based on changing needs of the business and to reflect a true impact of unit shortages so accurate expedite decisions can continue to be made and accounted for that are of the most economic benefit to a manufacturer.

6 Claims, 4 Drawing Sheets

SYSTEM FOR DETERMINING SHORTAGE COSTS

BACKGROUND OF THE INVENTION

1. Field of the Invention

The present invention relates to information handling systems and more particularly to a system for determining shortage costs.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are fabricated using multiple components arriving from multiple locations. Additionally, an information handling system manufacturer can make use of multiple manufacturing locations, which can be geographically dispersed. Additionally, with manufacturers, such as information handling system manufacturers, inbound supply chain and product line expansion can result in a growing coordination complexity which can result in increasing expedite spend to satisfy consumer and manufacturing needs.

For example, an information handling system manufacturer can have over 100 buyers supporting a plurality of different regions reviewing a large number (e.g., hundreds) of supply lines every day. One responsibility of the buyers is to communicate potential shortages and action plans in a timely manner. This responsibility can be especially challenging in an environment that does not provide the buyer with the autonomy to support their commodities without agreement being reached by different organizations where each organization can have differing objectives.

Accordingly, it would be desirable to provide a system that can determine shortage costs in a repeatable and sustainable manner. It would be further desirable to provide such a system that can take into account different shortage costs that affect different organizations and weight those shortage costs against the costs to expedite material in to cover those shortages.

SUMMARY OF THE INVENTION

In accordance with the present invention a system, which can determine shortage costs in a repeatable and sustainable manner, is set forth. Additionally, in certain embodiments, the system takes into account different shortage costs that influence different organizations and weight those shortage costs against the costs to expedite material in to cover those shortages. Additionally, in certain embodiments, the system can continue to be updated based on changing needs of the business and to reflect a true impact of unit shortages so accurate expedite decisions can continue to be made and accounted for that are of the most economic benefit to a manufacturer.

Such a system allows buyers to execute a regular (e.g., a daily) model that can review supply lines and recommend expedite moves that are provide an economic benefit to the information handling system manufacturer. Such a system also provides the buyers with an avenue for reporting a total cost for material, including any expediting cost) as well as a total estimated savings based on that shortage cost to their management teams.

In one embodiment, the invention relates to a method for determining shortage costs relating to delay in component shipments that includes associating a plurality of factors with a component, analyzing the plurality of factors within a shortage cost model to quantify a shortage cost associated with the plurality of factors where the analysis provides a quantified shortage cost associated with the component, and using the quantified shortage cost to determine whether to expedite shipment of the component.

In another embodiment, the invention relates to an apparatus for determining shortage costs relating to delay in component shipments that includes means for associating a plurality of factors with a component, means for analyzing the plurality of factors within a shortage cost model to quantify a shortage cost associated with the plurality of factors where the analysis provides a quantified shortage cost associated with the component, and means for using the quantified shortage cost to determine whether to expedite shipment of the component.

In another embodiment, the invention relates to a computer-readable storage medium storing computer program code for determining shortage costs relating to a delay in component shipments. The computer program code includes computer executable instructions configured for associating a plurality of factors with a component, analyzing the plurality of factors within a shortage cost model to quantify a shortage cost associated with the plurality of factors where the analysis provides a quantified shortage cost associated with the component, and using the quantified shortage cost to determine whether to expedite shipment of the component.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
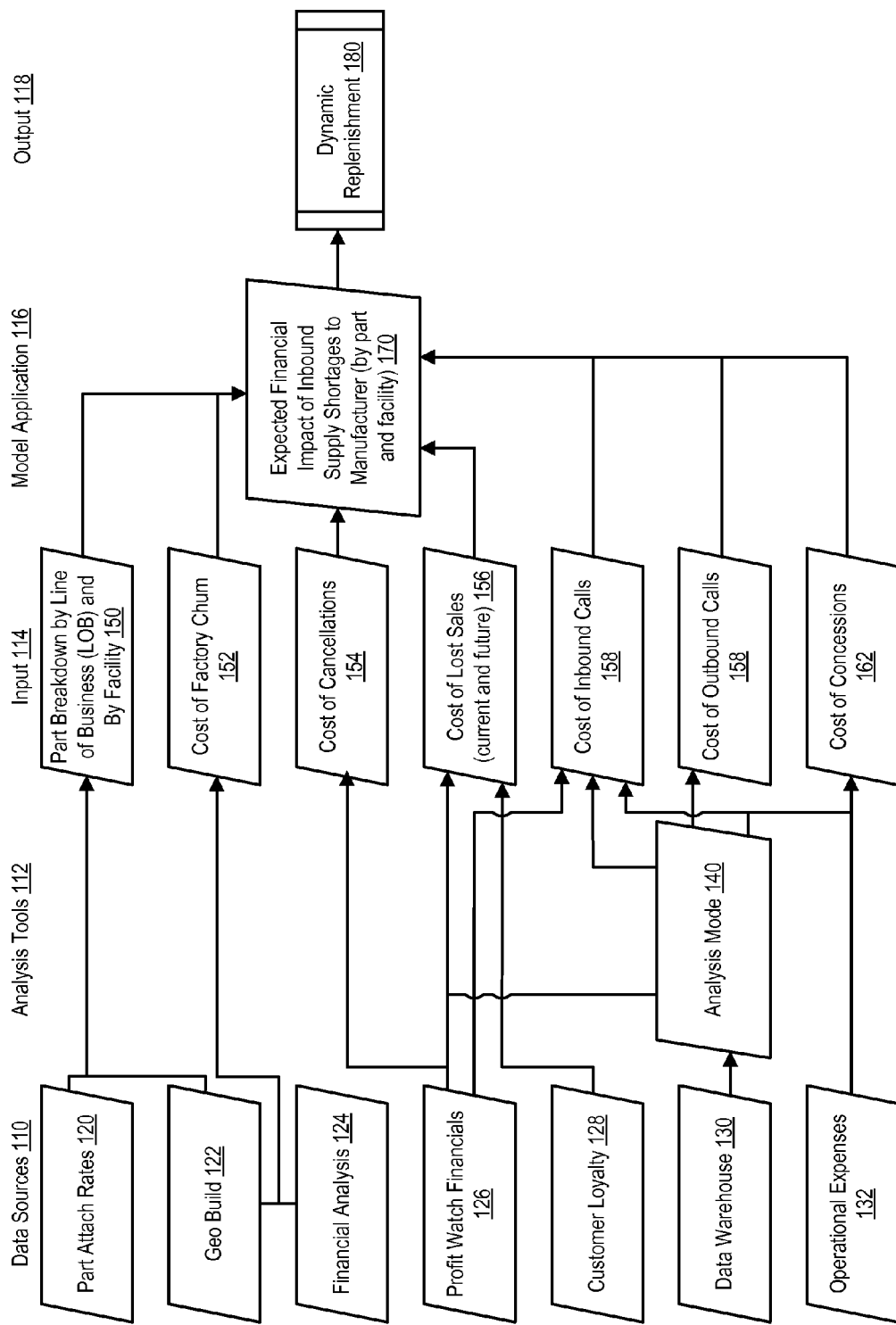
FIG. 1 shows a block diagram of an environment for managing shortages.

Referring to FIG. 1, a block diagram of an environment 100 for managing shortages is shown. More specifically, the environment 100 includes a data source portion 110, an analysis portion 112, an input portion 114, a model application portion 116, and an output portion 118. The data source portion 110 includes a plurality of data sources including a part attach rate module 120, a geographic build module 122, a financial analysis module 124, a profit watch portion 126, a customer loyalty portion 128, data queries from data warehouse module 130 and an operational expense module 132.

The part attach rate module 120 delineates what percentage of the time a particular product (e.g., 15" Flat Panel Monitor) is used on a particular information handling system. The geographic build module 122 tracks manufacturing locations and provides data regarding what types of systems are being built at which geographic location. The financial analysis module 124 provides data relating to labor costs, Units per Labor Hour (ULH) and Units per Hour (UPH). The profit watch module 126 generates data relating to revenue and margin for each system implicated by potential shortages. The customer loyalty module 128 generates data relating to customer loyalty for each system implicated by potential shortages. The data module 130 provides data related to customer experience, including but not limited to, customer cancellations, inbound and outbound telephone calls, times and frequencies, customer concessions, and the likelihood to repurchase analysis. The operational expense module 132 generates operational data for each system implicated by potential shortages.

The analysis portion 112 includes a statistical analysis module 140. The statistical analysis module 140 receives information from the profit watch financials module 128, the customer loyalty module 128 and the data warehouse module 130 and performs a statistical analysis on this data to determine how customer behavior relationships relate to increased lead time.

The input portion 114 includes a part breakdown module 150, a cost of factory module 152, a cost of cancellations module 154, a cost of lost sales module 156, a cost of inbound calls module 158, a cost of outbound calls 160 and a cost of concessions module 162. The part breakdown module 150 uses the part attach rate data provided by the part attach rate module 120 and the geographic build data provided by the geographic build module 122 and generates a parts breakdown (i.e., an attach rate) by line of business (LOB) and by manufacturing facility. The cost of factory module 152 uses the geographic build module 122 and the financial analysis module 124 to compute the cost a factory experiences by not being able to build systems in the most cost effective geographic location. The cost of cancellations module 154 uses date provided by the profit watch financial module 126 to determine how many cancellations have occurred and to assign a cost to the cancellations. The cost of lost sales module 156 uses data provided by the profit watch financials module 126 and the customer loyalty module 128 to generate a cost of lost sales (current and future). The cost of inbound calls module 158 uses data provided by the profit watch financials module 126 and the operational expenses module 132 as well as the information generated by the statistical analysis module 140 to generate information relating to a cost of inbound calls (i.e., a cost relating to frustrated customers contacting a manufacturer for status updates on their delayed systems). The cost of outbound calls 160 uses data provided by the operational expenses module 132 as well as the information generated by the statistical analysis module 140 to generate information relating to a cost of outbound calls (i.e., a cost relating to automated calls from a manufacturer to customers alerting them there will be a delay in the originally communicated estimated time of delivery (ETA) for their system). The cost of concessions module 162 uses data provided by the operational expenses module 132 as well as the information generated by the statistical analysis module 140 to generate information relating to a cost of concessions (i.e., a cost relating to upgrades and/or free products that a customer service representative is authorized to provide to the customer in an effort to retain the customer's business and loyalty.

The model application portion 116 includes a financial impact analysis module 170. The financial impact analysis module 170 receives inputs from the part breakdown module 150, the cost of factory module 152, the cost of cancellations module 154, the cost of lost sales module 156, the cost of inbound calls module 158, the cost of outbound calls 160 and the cost of concessions module 162. The financial impact analysis module 170 generates data relating to an expected financial impact relating to inbound supply shortages to a manufacturer. The data is broken down by part and by facility.

The financial impact analysis module 170 takes into account a plurality of factors when generating data relating to an expected financial impact. More specifically, in certain embodiments, the financial impact analysis module 170 generates the data using a financial impact model.

More specifically, for a Factory F, for j days late:

$$C_{Fj} = \sum_L (A_l \times X_{Lj} \times G_{FL}) + \left(\frac{X_j}{ULH_f} \times (CLH(OT)_F - CLH_F)\right) \times \sum_L G_{FL}$$

Where,
L is a line of business,
F is a facility,
$A_L$ is the attach rate of a part to a line of business,
$C_{Lj}$ is a customer cost for a line of business L that is j days late,
Xj is the number of arts that are j days late,
ULH is a units per labor hour,
CLH(OT) is a cost per labor hour for overtime,
CLH is a cost per labor hour, and
$G_{FL}$ is a geographic build percent of a line of business L in a facility F The output portion 118 includes a dynamic replenishment module 180. The dynamic replenishment module 180 receives the data relating to expected financial impact relating to inbound supply shortages and generates a dynamic replenishment plan. The dynamic replenishment plan determines when a supply shortage is of such a cost that rerouting of supplies at a cost of X will be less of an economic impact than the impending shortage situation.

Figure 2:
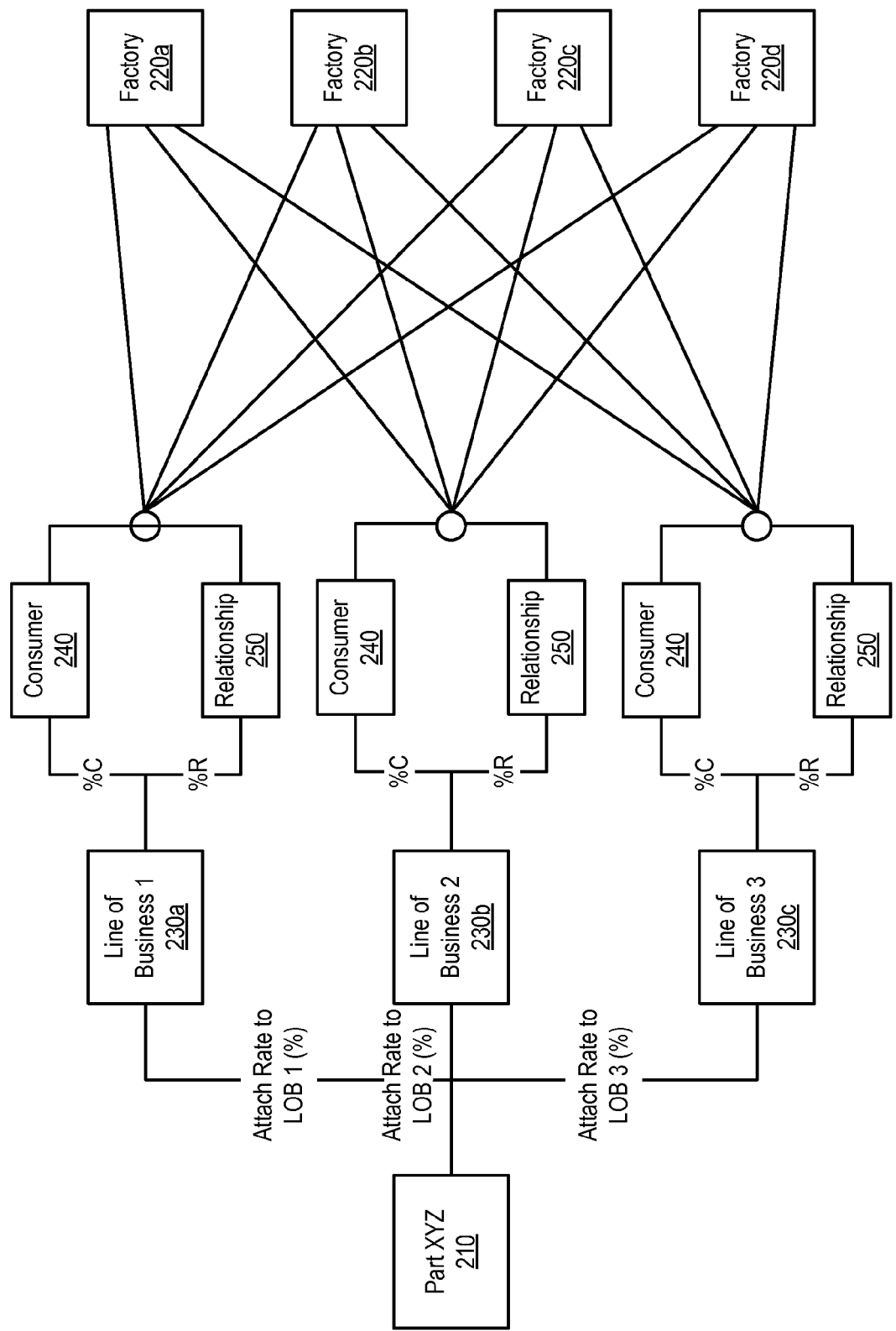
FIG. 2 shows a block diagram of a part attach rate analysis from component to factory.

Referring to FIG. 2, a block diagram of a part attach rate analysis from individual part (also referred to as a component) extrapolated down to a factory at which a system using the component as fabricated is shown. More specifically, a particular part 210 (e.g., part XYZ) can be used for manufacturing systems at a plurality of factories 220a, 220b, 220c, 220d (generally referred to as factory 220) which can be located at geographically disperse locations. Additionally, each factory may include one or a plurality of manufacturing lines. The part 210 can be used in one or more lines of business 230a, 230b, and 230c. Each line of business 230 can include consumer type customers 240 as well as relationship type customers 250.

The environment for managing shortages 100 takes a plurality of factors into account based upon how the part is used by a line of business, whether the customer is a consumer type customer or a relationship type customer and a factory in which the component is to be used. For example, a particular part might have a certain attach rate percentage for the line of business 230a while the same part might have different attach rate percentages for the lines of business 230b and 230c. Additionally, each line of business might have a certain attach rate percentage for consumer type customers 240 for that line of business and a different attach rate percentage for relationship type customers 250. Additionally, each factory 250 might have certain part requirements based upon a number of systems to be manufactured at that factory. An attach rate relates to an amount of time a product is used in a certain area (i.e., attach rate to a system, a line of business, and a factory).

Figure 3:
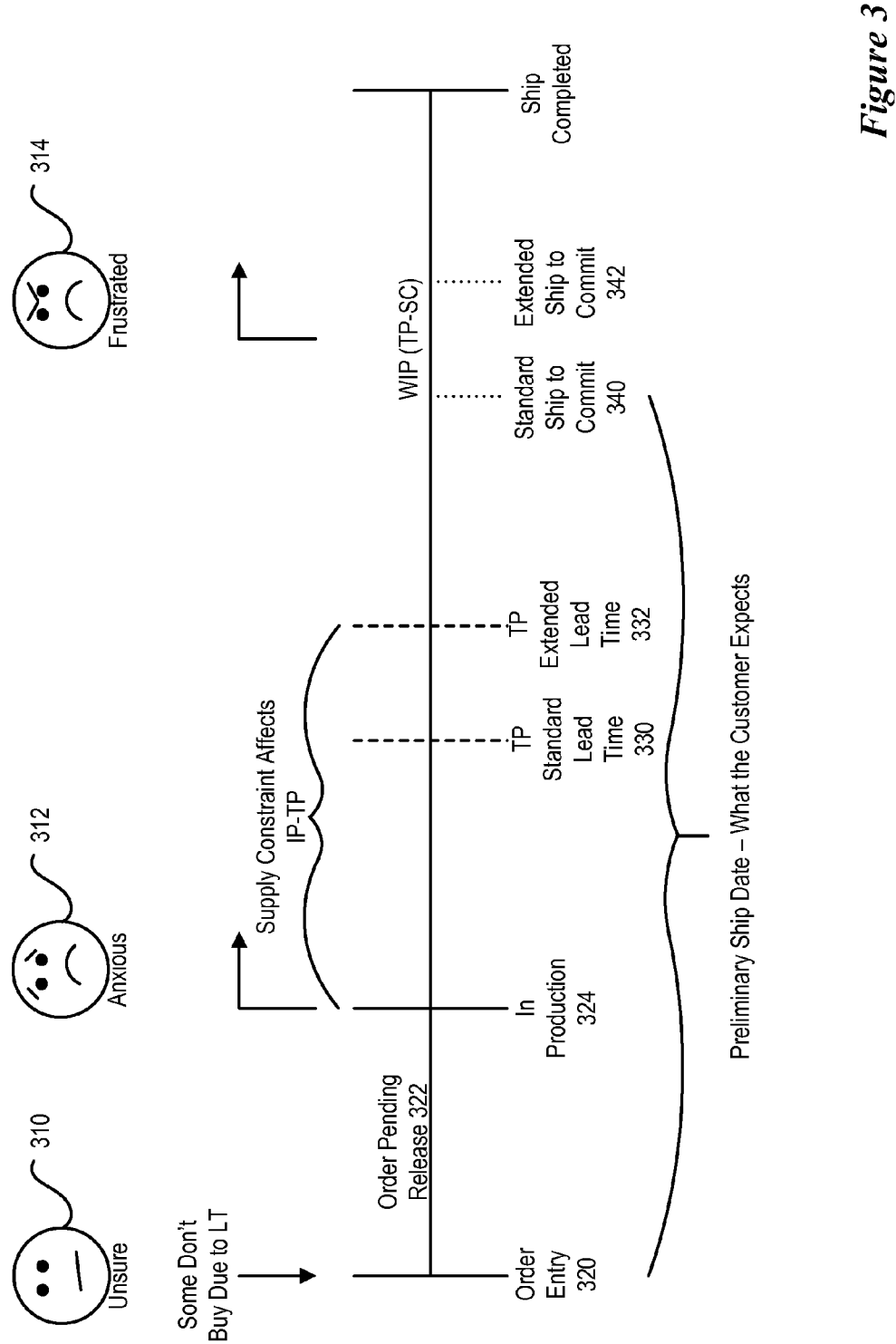
FIG. 3 shows a time line of a part shortage analysis for a part from receipt of an order to completion of the order.

FIG. 3 shows a time line of a part shortage analysis for a part from receipt of an order to completion of the order. More specifically, there are a plurality of types of customers that are taken into account when performing a part shortage analysis. For example, certain types of customers, characterized as unsure customers 310, do not place an order due to a stated lead-time. Other types of customers, characterized as anxious customers 312, might cancel an order when they receive notification of a delay in production of their order. Other types of customer, characterized as frustrated customers 314, might cancel their order when a committed ship date passes without receipt of their order. The system for managing shortages recognizes that the impact of a parts shortage can vary across the order timeline. For example, an unsure customer 310 might not purchase a system due to a lead-time that is indicated when the system is configured during an order entry stage 320.

After an order is entered at the order entry stage 320, the order is held by the system pending release at stage 322. The time difference between when an order is entered at stage 320 and an order enters production at stage 324 is the time during which the order is pending release 322. One example of a reason why an order is held is due to a parts shortage. The time that an order is held pending release can cause an anxious customer 312 to cancel their order.

When an order enters production at stage 324, the next checkpoint is a traveler pull (TP) stage 330. The traveler pull stage 330 is where all of the components to fabricate a system are available and so the components are kitted and fabrication of the system begins. Supply constraints can affect the traveler pull stage resulting in an extended lead-time traveler pull stage 332. The supply constraints can be characterized as in production (IP) minus traveler pull (TP).

When a system completes fabrication, the completion is characterized as a ship to commit stage 340. Supply constraints can affect the ship to commit stage resulting in an extended lead-time ship to commit stage 342. Extending the lead-time of the ship to commit stage 342 can cause a frustrated customer 314 to cancel their order. Such a cancellation can be especially costly to a manufacturer, as the system has essentially been completed at this point.

The final stage of the order timeline is the ship-completed stage 350. The ship-completed stage 350 is the point at which the system is finished being fabricated and ships to the customer. How the supply constraints affect work in process (WIP) can be characterized as traveler pull (TP) stage minus the ship completed (SC) stage. Extending the time of the work in process can also result in a frustrated customer 314.

Figure 4:
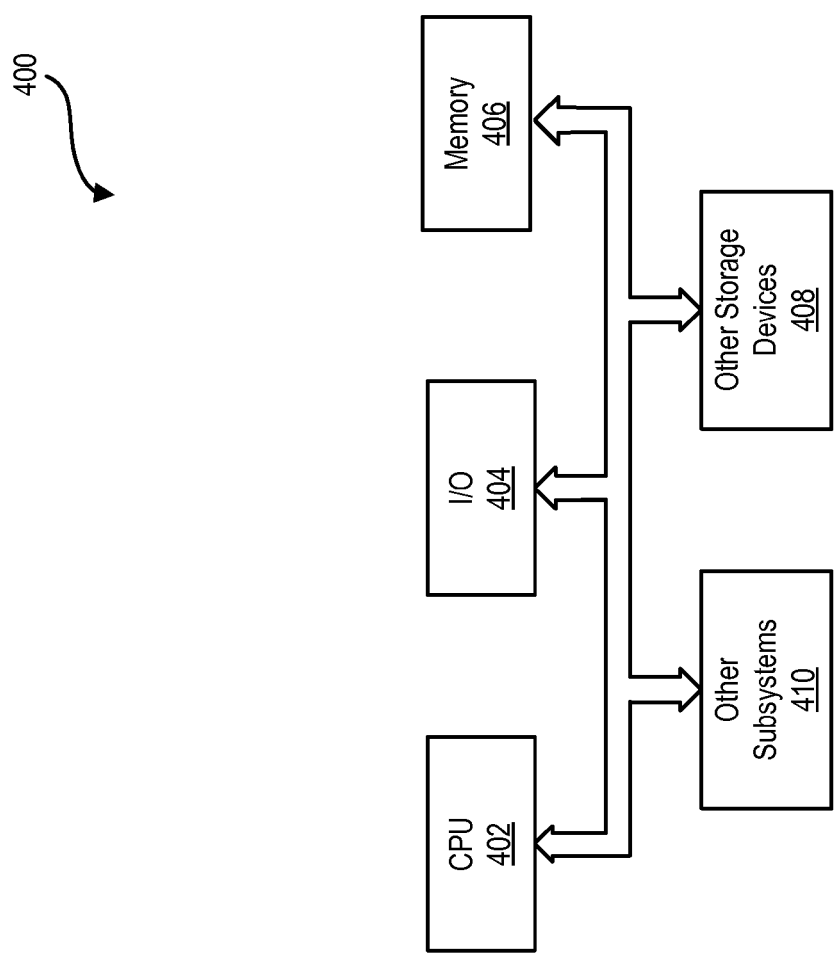
FIG. 4 shows a block diagram of an information handling system having components managed via the environment for managing shortages.

Referring briefly to FIG. 4, a system block diagram of an information handling system 400 having components managed via the environment for managing shortages is shown. The information handling system 400 includes a processor 402, input/output (I/O) devices 404, such as a display, a keyboard, a mouse, and associated controllers, a memory 406 including volatile memory such as random access memory (RAM) and non-volatile memory such as a hard disk and drive, and other storage devices 408, such as an optical disk and drive and other memory devices, and various other subsystems 410, all interconnected via one or more buses 412. One example of another storage device 408 is a virtual appliance USB key 420.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer implemented method for determining shortage costs relating to delay in component shipments comprising:

associating via a computer system a plurality of factors with a component, the plurality of factors comprising a line of business factor, a type of customer factor and a factory factor, the line of business factor, a type of customer factor and a factory factor each comprising respective attach rates, analyzing, via the computer system, the plurality of factors within a shortage cost model to quantify a shortage cost associated with the plurality of factors, the analyzing providing a quantified shortage cost associated with the component, the analyzing uses the attach rates when providing the quantified shortage cost; and using, via the computer system, the quantified shortage cost to determine whether to expedite shipment of the component.

2. The method for determining shortage costs of claim 1 wherein the analyzing further comprises:

weighting the plurality of factors when providing the quantified shortage cost.

3. An apparatus for determining shortage costs relating to delay in component shipments comprising:

means for associating a plurality of factors with a component, the plurality of factors comprising a line of business factor, a type of customer factor and a factory factor, the line of business factor, a type of customer factor and a factory factor each comprising respective attach rates, means for analyzing the plurality of factors within a shortage cost model to quantify a shortage cost associated with the plurality of factors, the analyzing providing a quantified shortage cost associated with the component, the analyzing uses the attach rates when providing the quantified shortage cost; and means for using the quantified shortage cost to determine whether to expedite shipment of the component.

4. The apparatus for determining shortage costs of claim 3 wherein the means for analyzing further comprises:

means for weighting the plurality of factors when providing the quantified shortage cost.

5. A computer-readable storage medium storing computer program code for determining shortage costs relating to delay in component shipments, the computer program code comprising computer executable instructions for executing on a processor of a computer system, the computer executable instructions being configured for:

associating, via the computer system, a plurality of factors with a component, the plurality of factors comprising a line of business factor, a type of customer factor and a factory factor, the line of business factor, a type of customer factor and a factory factor each comprising respective attach rates;

analyzing, via the computer system, the plurality of factors within a shortage cost model to quantify a shortage cost associated with the plurality of factors, the analyzing providing a quantified shortage cost associated with the component; and using, via the computer system, the quantified shortage cost to determine whether to expedite shipment of the component, the analyzing uses the attach rates when providing the quantified shortage cost.

6. The computer-readable storage medium of claim 5, wherein the computer program code further comprises computer executable instructions configured for:

weighting the plurality of factors when providing the quantified shortage cost.

* * * * *